(12) United States Patent
Ye et al.

(10) Patent No.: US 10,678,410 B2
(45) Date of Patent: Jun. 9, 2020

(54) BROWSER-BASED IMAGE PROCESSING

(71) Applicant: Alibaba Group Holding Limited, George Town (KY)

(72) Inventors: Hao Ye, Hangzhou (CN); Keliang Ye, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 14/524,792

(22) Filed: Oct. 27, 2014

(65) Prior Publication Data
US 2015/0121196 A1      Apr. 30, 2015

(30) Foreign Application Priority Data
Oct. 29, 2013   (CN) .......................... 2013 1 0519643

(51) Int. Cl.
| | |
|---|---|
| *G06F 17/20* | (2006.01) |
| *G06F 3/0484* | (2013.01) |
| *G06T 11/60* | (2006.01) |
| *G06F 40/14* | (2020.01) |
| *G06F 40/166* | (2020.01) |

(52) U.S. Cl.
CPC .......... *G06F 3/04845* (2013.01); *G06F 40/14* (2020.01); *G06F 40/166* (2020.01); *G06T 11/60* (2013.01); *G06T 2207/20096* (2013.01)

(58) Field of Classification Search
CPC .................................................. G06F 3/04845
See application file for complete search history.

(56) References Cited

U.S. PATENT DOCUMENTS

| | | | | |
|---|---|---|---|---|
| 5,694,532 A | * | 12/1997 | Carey ................ | G06F 3/04842 345/419 |
| 6,961,905 B1 | * | 11/2005 | Cover .................. | G06F 3/0481 709/219 |
| 7,076,498 B2 | | 7/2006 | Banerjee et al. | |
| 7,627,174 B1 | * | 12/2009 | Adams ................ | H04N 1/3872 382/173 |
| 7,631,252 B2 | * | 12/2009 | Hertzfeld ............... | G06T 11/60 382/254 |
| 8,014,608 B2 | | 9/2011 | Adams et al. | |
| 8,385,589 B2 | | 2/2013 | Erol et al. | |

(Continued)

FOREIGN PATENT DOCUMENTS

EP          2458560          5/2012

OTHER PUBLICATIONS

Sarris, Simon, HTML5 multiple canvas on a single page (Dec. 19, 2010).*

(Continued)

*Primary Examiner* — Shahid K Khan
(74) *Attorney, Agent, or Firm* — Van Pelt, Yi & James LLP

(57) ABSTRACT

Performing image processing is disclosed, including: causing an original image to be displayed in a first editable object of a page, wherein the first editable object is generated based at least in part on web page data from a server; receiving an input track corresponding to the original image of the first editable object of the page; selecting at least a portion of the original image relative to the input track to use as a result image; and causing the result image to be displayed in a second editable object, wherein the second editable object is generated based at least in part on the web page data.

33 Claims, 10 Drawing Sheets

(56) References Cited

U.S. PATENT DOCUMENTS

| | | | | |
|---|---|---|---|---|
| 8,532,435 | B1* | 9/2013 | Hegde | G06T 3/4092 |
| | | | | 382/164 |
| 8,559,732 | B2* | 10/2013 | Rayner | G11B 27/034 |
| | | | | 382/224 |
| 8,635,518 | B1 | 1/2014 | Bhanoo | |
| 9,143,542 | B1* | 9/2015 | Tseytlin | H04L 65/403 |
| 9,654,602 | B2* | 5/2017 | Zacharias | H04L 67/42 |
| 10,101,983 | B2* | 10/2018 | Beckman | G06F 9/45529 |
| 2003/0214536 | A1* | 11/2003 | Jarrett | G06F 3/0481 |
| | | | | 715/831 |
| 2004/0148576 | A1* | 7/2004 | Matveyenko | G06F 40/14 |
| | | | | 715/235 |
| 2004/0215719 | A1* | 10/2004 | Altshuler | H04L 67/02 |
| | | | | 709/204 |
| 2005/0041866 | A1* | 2/2005 | Silverman | G06F 3/04883 |
| | | | | 382/188 |
| 2008/0209311 | A1 | 8/2008 | Agronik et al. | |
| 2008/0225057 | A1 | 9/2008 | Hertzfeld et al. | |
| 2008/0285892 | A1* | 11/2008 | Sposato | G06T 11/60 |
| | | | | 382/311 |
| 2009/0285444 | A1* | 11/2009 | Erol | G06F 17/30253 |
| | | | | 382/100 |
| 2010/0177118 | A1* | 7/2010 | Sytnikov | G06T 11/60 |
| | | | | 345/619 |
| 2012/0246114 | A1* | 9/2012 | Edmiston | G06F 16/51 |
| | | | | 707/625 |
| 2013/0182002 | A1* | 7/2013 | Macciola | H04N 1/387 |
| | | | | 345/589 |
| 2013/0278626 | A1* | 10/2013 | Flagg | G06Q 30/0643 |
| | | | | 345/629 |
| 2013/0283192 | A1* | 10/2013 | Kranzberg | G06F 3/04815 |
| | | | | 715/760 |
| 2014/0250363 | A1* | 9/2014 | Wichmann | G06F 8/30 |
| | | | | 715/234 |

OTHER PUBLICATIONS

UVL, How do I make a transparent canvas in HTML5? (Sep. 30, 2012).*

Chen et al., A Novel Color Edge Detection Algorithm in RGB Color Space (2010), ICSP2010 Proceedings.*

Chambers, Mike, Layering Multiple Canvas Elements using JavaScript and EaselJS (Sep. 27, 2012).*

Sarris, Simon, HTML5 multiple canvas on a single page (Dec. 19, 2010) available at https://stackoverflow.com/questions/4020910/html5-multiple-canvas-on-a-single-page (last accessed Jul. 6, 2018) (Year: 2010).*

UVL, How do I make a transparent canvas in HTML5? (Sep. 30, 2012) available at https://stackoverflow.com/questions/4815166/how-do-i-make-a-transparent-canvas-in-html5 (last accessed Jul. 6, 2018) (Year: 2012).*

Chambers, Mike, Layering Multiple Canvas Elements using JavaScript and EaselJS (Sep. 27, 2012) available at http://www.mikechambers.com/blog/2011/01/25/layering-multiple-canvas-elements-using-javascript-and-easeljs/ (last accessed Jul. 6, 2018) (Year: 2012).*

* cited by examiner

Result Image B

Original Image A

Original Image A

BROWSER-BASED IMAGE PROCESSING

CROSS REFERENCE TO OTHER APPLICATIONS

This application claims priority to People's Republic of China Patent Application No. 201310519643.2 entitled METHOD AND DEVICE FOR PROCESSING IMAGES, filed Oct. 29, 2013 which is incorporated herein by reference for all purposes.

FIELD OF THE INVENTION

The present application relates to image processing technology. In particular, the present application relates to techniques for browser-based image processing.

BACKGROUND OF THE INVENTION

As communication technologies have developed, devices are designed with more and more features. As a result, a device may run a growing number of corresponding applications. Such applications include native applications that are prepackaged on a device and third party applications that need to be downloaded. Some applications may enable the user to perform page browsing and/or page editing. Generally a page may comprise a web page that is designed using HyperText Markup Language (HTML). In order to enrich and improve the aesthetics of the page displayed at a device, the page may contain some images. Such images may include drawings, photographs, and/or other prints.

In some situations, only a portion of an original image is desired by a user. That is, a user may wish to retain only a portion of the original image content. For example, a user may desire to extract only a part of an image that is displayed at a web page for other uses. Conventionally, the user can use image processing tools, e.g., Photoshop®, that are provided by a third party to copy a portion of the original image.

However, third party-provided image processing tools would need to be purchased and also installed on the device, which is potentially costly and unsuitable for users who are not familiar with complex image processing tools.

BRIEF DESCRIPTION OF THE DRAWINGS

Various embodiments of the invention are disclosed in the following detailed description and the accompanying drawings.

DETAILED DESCRIPTION

Figure 1:
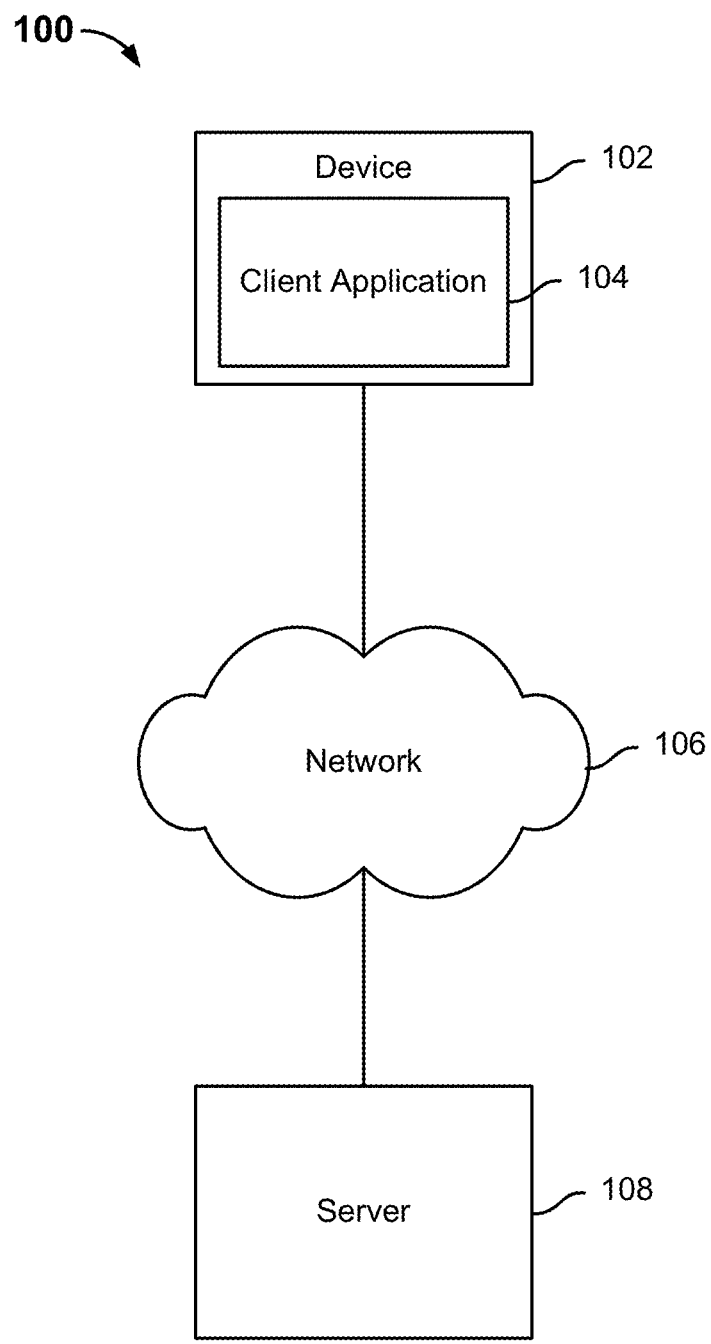
FIG. 1 is a diagram showing an embodiment of a system for performing image processing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of browser-based image processing are described herein. Web page data is used by a browser application to enable a portion of an original image at a page to be selected and used as a new image. In various embodiments, an "original image" refers to the image to be processed and a "result image" refers to the new image that is generated from a portion of the original image. In some embodiments, a user may upload an original image to a web page that is rendered by the browser application. An input track comprising a line or a shape drawn with respect to the original image is received. In some embodiments, the input track is submitted by the user via an input interface (e.g., a mouse, a track pad). At least a portion of the original image relative to the input track is selected to use as the result image. The result image may be displayed at the page. The result image may then be stored by the user for subsequent operations. As such, the original image can be processed directly in a browser using the web page data and/or a module (e.g., a plug-in) associated with the browser, without the need of a third party image processing tool.

FIG. 1 is a diagram showing an embodiment of a system for performing image processing. System 100 includes device 102, client application 104, network 106, and server 108. Network 106 comprises high-speed data networks and/or telecommunications networks. Device 102 is configured to communicate with server 108 over network 106.

Device 102 may comprise a mobile phone, a personal digital assistant (PDA), a wireless hand-held device, a wireless netbook, a personal computer, a portable computer, an MP3 player, an MP4 player, a mobile device, a tablet device, or any other computing device. Client application 104 is executing at device 102. In various embodiments, client application 104 comprises a browser application. Device 102 includes and/or is otherwise associated with an input interface (not shown in the diagram) through which a user may input a track, shape, or other movement relative to an image displayed at device 102. Examples of an input interface include a mouse, a keyboard, a touch pad, a touch screen, an input pad, and a track pad.

A user browsing web pages using client application 104 executing at device 102 may select an element that causes a request for web page data to be sent to server 108. The requested web page data is then returned by server 108 to be rendered by client application 104. The rendered web page data and/or additional module (e.g., plug-in) of client application 104 provides a web page at which a user may upload an original image that the user desires to process. In some embodiments, the web page data includes HyperText Markup Language (HTML), style sheets (e.g., Cascade Style Sheet), and computer code (e.g., JavaScript). In some embodiments, the executed web page data may send data to server 108 for server 108 to perform at least some of the image processing described herein. The original image is displayed inside a first editable object at the web page. In various embodiments, an editable object comprises a container for graphics at a web page. An input track corresponding to the original image at the web page is received via the input interface associated with device 102. As will be described in further detail below, a portion of the original image relative to the input track is selected to use as the result image using the web page data. The result image comprising the selected at least portion of the original image is displayed in a second editable object at the web page. The user may then store the result image and/or use it for other operations.

Embodiments described herein enable a portion of an original image to be selected and processed using a browser that is displaying the original image on a web page. Therefore, operations such as image uploading, image processing, and image delivery can be completed on a single web page that is displayed by a browser, without the need for a third-party image processing tool.

Figure 2:
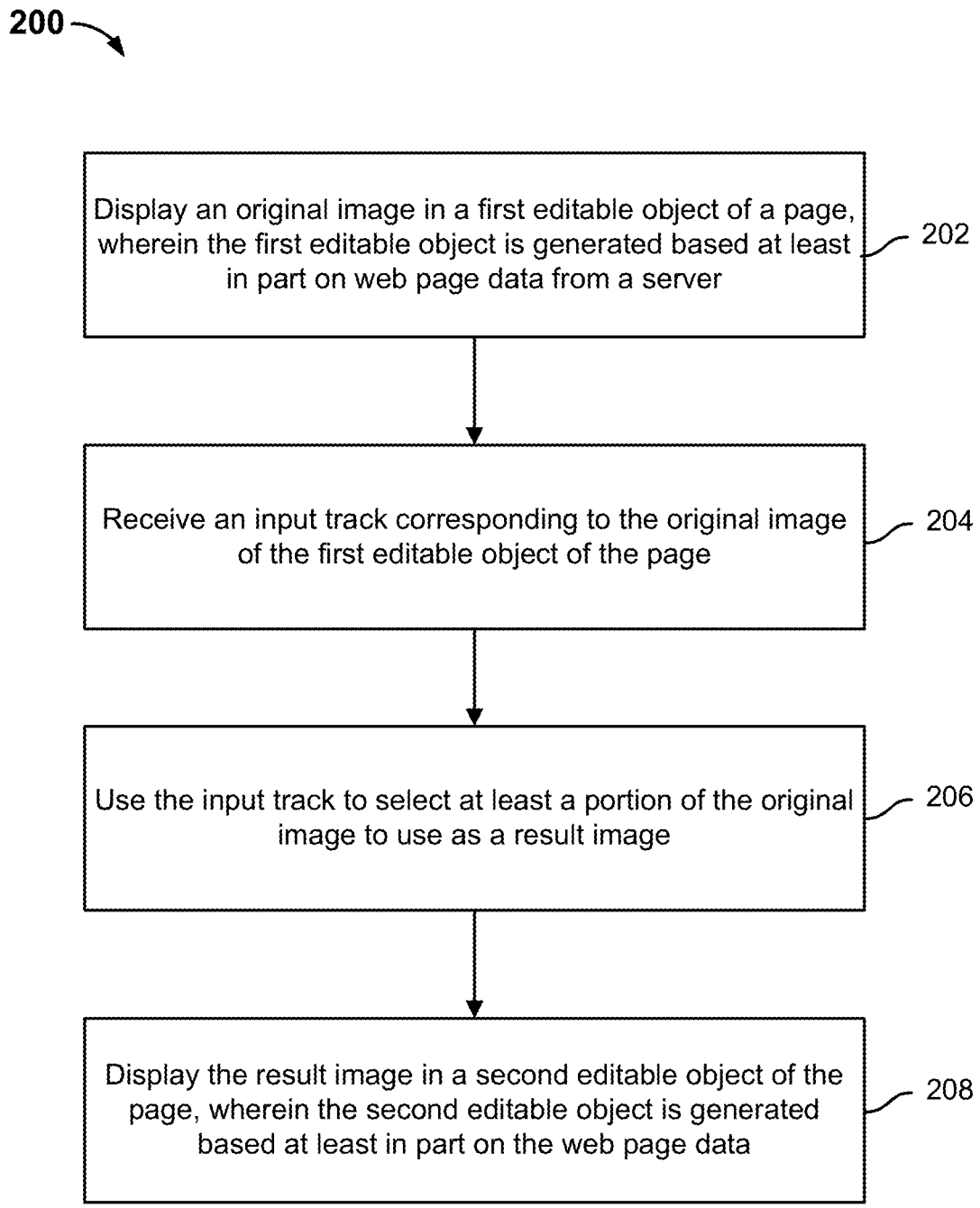
FIG. 2 is a flow diagram showing an embodiment of a process for performing image processing.

FIG. 2 is a flow diagram showing an embodiment of a process for performing image processing. In some embodiments, process 200 is implemented at system 100 of FIG. 1.

At 202, an original image is caused to be displayed in a first editable object of a page, wherein the first editable object is generated based at least in part on web page data from a server.

A device may have requested web page data from a server. The web page data may be rendered by a client application executing at the device to serve as an application in which an original image is to be uploaded to a web page and that a portion of the original image is enabled to be extracted and stored as a new, result image. In various embodiments, the client application executing at the device that renders the web page data comprises a browser application. In some embodiments, the web page data includes markup language (e.g., HTML), style language (e.g., Cascade Style Sheet), and computer code (e.g., JavaScript). In some embodiments, the web page data may cause the device to send data to a server for the server to perform at least some of the image processing described herein.

In some embodiments, an original image is uploaded by a user, provided by the web page data, and/or otherwise obtained. The original image comprises the unedited image from which a portion is to be selected and the selected portion is to be stored as a new, result image.

The web page data includes data to be used by the browser application to display a first editable object in the rendered web page and display the original image inside the first editable object. In various embodiments, the first editable object may be but is not limited to an HTML5 canvas element, an object element, or an embedded element.

In some embodiments, the original image is drawn on the first editable object based on the pixel information of the original image. In some embodiments, the web page data includes computer code that adapts the dimensions of the first editable object to the dimensions of the original image. For example, the dimensions of the first editable object may be generated to be greater than or equal to the dimensions of the original image.

For example, each pixel of the original image can include three channels of pixel information, such as a red channel, a green channel, and a blue channel. As such, the original image may be based on the RGB color model. In another example, each pixel of the original image may also comprise four channels of pixel information, such as an alpha channel in addition to the three RGB channels. As such, the original image may also be based on the RGBA color model.

For each pixel, the value selected for the R channel (i.e., the red component) may be an integer between 0 and 255. For each pixel, the value selected for the G channel (i.e., the green component) may be an integer between 0 and 255. For each pixel, the value selected for the B channel (i.e., the blue component) may be an integer between 0 and 255. For each pixel, the A channel (i.e., the alpha channel) can also be called the transparent channel. For each pixel, the value selected for the A channel may be an integer between 0 and 255, with 0 indicating that the pixel is transparent and 255 indicating that the pixel is entirely visible and not transparent.

For example, in embodiments wherein the first editable object is an HTML5 canvas element, a canvas program can be invoked by the browser application to provide it. In some embodiments, a plug-in associated with the browser application is invoked to help render the web page data, such as, for example, to create or load object elements or embed elements. For example, the plug-in can be a Flash plug-in.

At 204, an input track corresponding to the original image of the first editable object of the page is received.

In various embodiments, an input track comprises a selection that corresponds to a portion of the original image in the first editable object of the page. In various embodiments, the input track is enabled to be received at the page using computer code and/or mark-up language included in the web page data. In some embodiments, the input track comprises a line or shape drawn by the user with respect to the original image using an input interface such as, for example, an input pad, a track pad, a mouse, a touchscreen, and/or a keyboard, over a portion of the original image. For example, the user uses an input interface to outline a portion of the original image that he or she would like to store as a separate image. In some embodiments, the user first selects a drawing tool (e.g., a pen, a marker) provided and displayed by the web page data at the webpage and then inputs the track over the original image. For example, a drawing menu that includes one or more selections of different drawing tools can be provided in the JavaScript included in the web page data. In some embodiments, a Bezier curve drawing tool (e.g., the bezierCurveTo( ) function supported by the HTML canvas library) can be provided by a canvas application to draw the input track. The selected drawing tool may be associated with a certain width or radius (e.g., a width or radius of X number of pixels) such that the track may be of a particular thickness or other dimension. In some embodiments, the input track comprises a set of pixels and/or pixel coordinates that form a line or shape over the original image.

In some embodiments, the input track comprises a closed track. A closed track comprises a track that fully encloses a portion of the original image. In some embodiments, the input track comprises a track that is not closed. A track that is not closed does not fully enclose a portion of the original image. In some embodiments, in the event that the input track does not form a closed track, computer code included in the web page may extrapolate data associated with the input track to form an enclosed track. In some embodiments, in the event that the input track does not form a closed track, an input track may still be regarded as a closed track so long as the distance between the starting and ending points fall within a distance threshold value range included in the web page data. For example, factors such as the operating agility of the user and the precision of track input may cause the track input by the input interface to not be a closed track, but a track with a short gap between its starting and ending points. Such a track is still regarded as a closed track if the gap is within a distance threshold.

In some embodiments, the user input track is mapped to corresponding pixels/pixel positions/pixel coordinates in the original image in the first editable object. In some embodiments, the input track is detected/received in a separate editable object, one that is different from the editable object in which the original image is displayed and also different from the editable object in which the result image (the selected portion of the original image) will be displayed. In some embodiments, the editable object used to receive the input track is an HTML5 canvas element. The dimensions (e.g., width and length) of the editable object used to receive the input track may be adapted to the dimensions of the original image. For example, the dimensions of the editable object used to receive the input track may be greater than or equal to the dimensions of the original image. In some embodiments, the editable object used to receive the input track overlays the editable object in which the original image is displayed. In some embodiments, the pixel values of all pixels of the editable object that is used to receive the input track can be set to zero so as not to interfere with the display of the original image. In some embodiments, the pixel values of the values associated with the input track may be greater than zero so as to visually indicate to the user where the input track is relative to the original image.

At 206, at least a portion of the original image is selected relative to the input track to use as a result image.

The input track is mapped onto the first editable object to select at least a portion of the original image to serve as a result image. In various embodiments, the input track is used to select at least a portion of the original image to use as a result image using computer code and/or mark-up language included in the web page data. Put another way, the at least portion of the original image to select to use as the result image is determined relative to the positions of the pixels associated with the input track.

In various embodiments, which portion of the original image is selected relative to the input track is determined based on one or more preset selection rules. In some embodiments, the one or more preset selection rules may be included in the web page data. In a first example, if the input track is a linear track (e.g., a linear path that does not close), the portion of the original image of the first editable object that should be selected to serve as the result image comprises a portion of the original image relative to the track according to a preset rule. For example, the selected portion of the original image can be indicated by the preset selection rule as being above, below, to the left, or to the right of the linear input track.

In a second example, if the input track is a closed track, the portion of the original image of the first editable object that should be selected to serve as the result image comprises a portion of the original image relative to the closed track according to a preset selection rule. For example, the selected portion of the original image can be indicated by the preset selection rule as being the portion of the original image that is enclosed by the closed track or the portion of the original image that is outside of the area that is enclosed by the closed track.

In a third example, if the input track comprises a planar area, e.g., a two-dimensional area filled in by a user via an input interface, the portion of the original image of the first editable object that should be selected to serve as the result image comprises a portion of the original image relative to the planar area according to a preset selection rule. For example, the selected portion of the original image can be indicated by the preset selection rule as being the portion of the original image that is included in the planar track or the portion of the original image that is outside of the area that is included in the planar track.

In some embodiments, the track input received via the input interface will have a certain width (e.g., of more than one pixel) or other dimension. Therefore, a preset selection rule may also be used to determine whether the portion of the original image that is covered by the width of the input track should also be content that is to be included in the result image. Therefore, the result image may include a portion of the original image that is neither enclosed by or outside of the enclosure by the input track but covered by the input track itself.

In some embodiments, the width or other dimension of the input track may be adjusted so as to refine the shape of the input track. The adjusted input track can help the user improve the accuracy of the result image selection. As will be described in further details below, edge detection technology may be used to adjust the shape of the input track. Then, the adjusted input track is used to select at least a portion of the original image in the first editable object to use as the result image.

At 208, the result image is caused to be displayed in a second editable object of the page, wherein the second editable object is generated based at least in part on the web page data.

In some embodiments, a new editable object is created at the page to use to display the result image selected from the original image of the first editable object. In some embodiments, the new editable object used to display the result image is an HTML5 canvas element. In some embodiments, the pixel values of the pixels of the new editable object used to display the result image are initially set to zero. The selected at least portion/region of the original image of the first editable object is mapped to the new editable object using computer code and/or mark-up language included in the web page data. The pixel information that is included in the selected at least portion/region of the original image of the first editable object is copied to the new editable object to copy the result image to the new editable object.

In some embodiments, the pixel information of the first editable object comprises alpha channel values and when the pixel information of the first editable object is mapped onto the new editable object, the alpha channel values of the pixels associated with the result image are set to numerical values greater than 0 and less than 255 and the alpha channel values of non-result image pixels are set to zero.

In various embodiments, the result image can be stored. For example, the user can store the result image at a storage that is local to the device on which the browser application is running. The result image that is selected from the original image in the first editable object can be used to conduct subsequent operations. For example, the result image can be stored, used to substitute the original image at the displayed page, and copied to be displayed at a different page. In some embodiments, more than the portion of the original image that is selected using the input track may be included in the result image. Such additional portions may be displayed transparently, hidden, or eventually deleted, for example.

As such, process 200 describes embodiments in which the extraction of a portion of an original image as a new, result image can be performed in a browser application. No third party tools are needed in the processing as the functionalities are enabled using the web page data and/or plug-ins associated with the browser application. Furthermore, the new, result image is generated and displayed at the web page in real-time.

Figure 3:
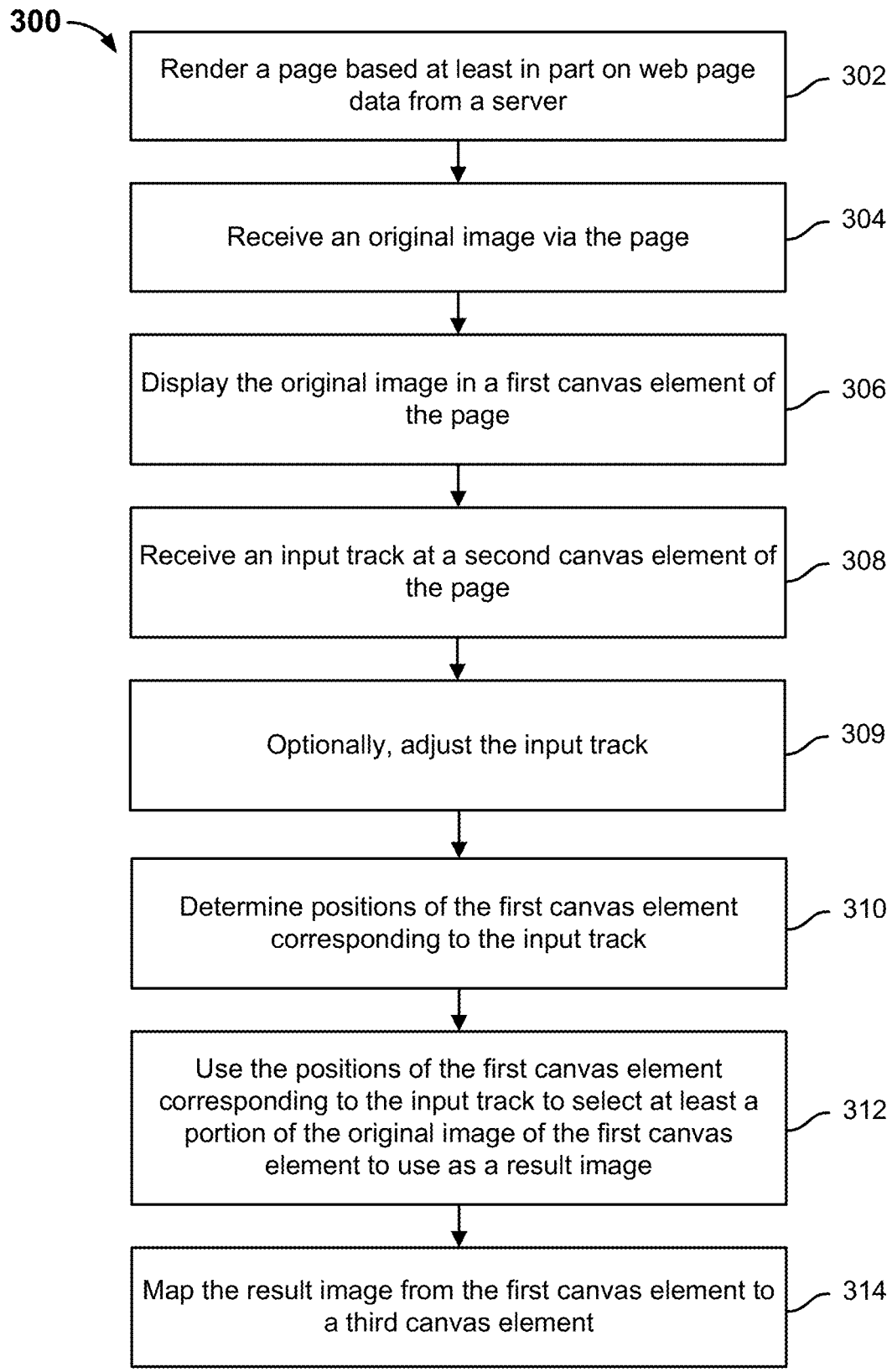
FIG. 3 is a flow diagram showing an example of a process for performing image processing.

FIG. 3 is a flow diagram showing an example of a process for performing image processing. In some embodiments, process 300 is implemented at system 100 of FIG. 1.

Process 300 illustrates an example process of enabling a user to select a portion of an original image to use as a new separate image (the result image) at a page in a browser-based application. Process 300 will refer to FIGS. 4A, 4B, and 4C which show example images corresponding to different stages of process 300.

At 302, a page is rendered based at least in part on web page data from a server. For example, a web page data is configured to be used by a browser application to run a canvas application and to render a web page that enables a user to upload an original image and to select a portion of the original image to use as a new, result image. In addition to the content that would enable such processing of the original image, the web page data may also include text and/or other content that is rendered and displayed by the browser application.

At 304, an original image is received via the page. The displayed page may include an interactive element that enables the user to upload an original image that the user would like to process. For example, the user may upload a locally stored image or input an address (e.g., a uniform resource locator) that can be used to locate an image on the Internet.

At 306, the original image is displayed in a first canvas element of the page. The browser may use the canvas application to render the original image that is uploaded by the user. The pixel information of the original image is mapped onto the first canvas element of the page. The dimensions of the first canvas element can be adapted to the dimensions of the original image. For example, the dimensions of the first canvas element may be greater than or equal to the dimensions of the original image.

For example, the browser may specifically use an interface function (e.g., getPixel( )) to acquire the pixel information of each pixel of the original image. Then, the browser can invoke the DrawImage( ) method of the canvas application to draw the original image onto the first canvas element using the pixel information of the original image.

In some embodiments, if the dimensions of the uploaded original image are outside of a designated dimension range (e.g., a range between the smallest and the largest acceptable dimensions of the original image), e.g., if the original image is too large or too small, the browser may shrink or enlarge the original image so that the adjusted dimensions fall within the designated dimension range. For example, the designated dimension range is indicated in the web page data. Then, the browser may create the first canvas element, a second canvas element, and a third canvas element, as described with process 300 in accordance with the dimensions of the adjusted original image. The browser can automatically adjust the dimensions of the original image using computer code and the designated dimension range included in the web page data and so manual adjustment of the dimensions of the original image is not needed. In the event that the dimensions of the original image had been adjusted at step 306, then steps 308 through 314 would be performed using the adjusted version of the original image.

Figure 4C:
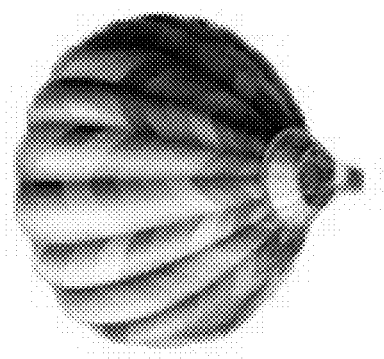
FIGS. 4A, 4B, and 4C show example images corresponding to different stages of process 300.
Figure 4B:
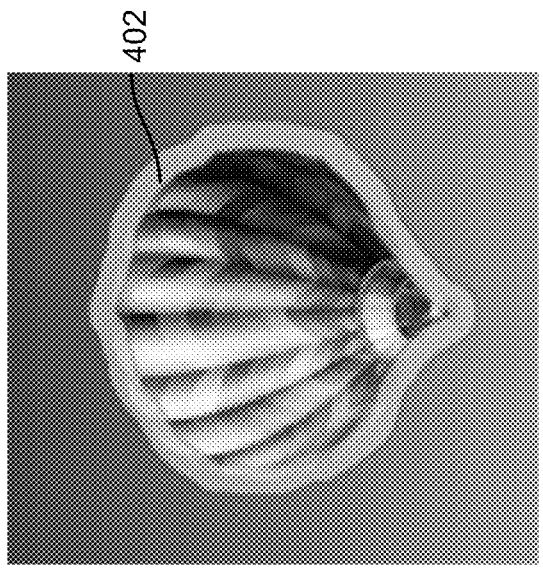
Figure 4A:
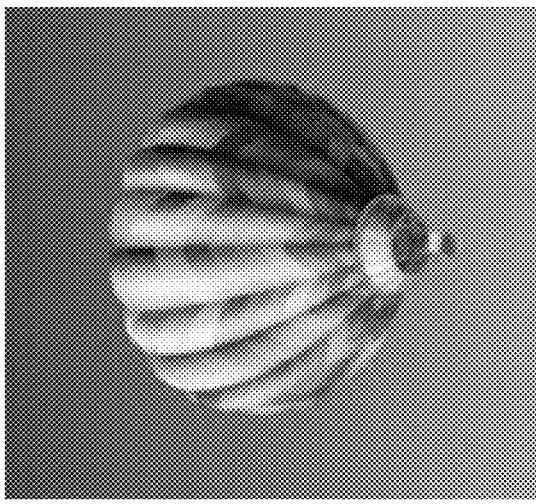

FIG. 4A shows an original image. Original image A of FIG. 4A may be selected by the user to be uploaded to the page. In the example of FIG. 4A, original image A includes an image of a hot air balloon and background content. In this example, assume that original image A is currently displayed in a first canvas element and that the user would like to store only the portion of original image A containing the hot air balloon as a result image, result image B.

Returning to process 300, at 308, an input track is received at a second canvas element of the page. A second canvas element may be used to record the track input by the user on the page. In various embodiments, the track input by the user on the page comprises a cursor movement track, a movement track received via a track pad, a movement track received via an input pad, and/or a movement track received via a keyboard. In some embodiments, the application provided by the browser using the web page data offers one or more drawing tools from which a user can select one to use to draw a track over the original image. The user may select a specific drawing tool via a user interface widget such as a selection button or the like. For example, drawing tools may include a pencil, a marker, and a brush and each may be associated with a different width or other dimension such that a line drawn over the original image with different drawing tools may be associated with a different width/thickness. The input track comprises a set of pixels and/or pixel positions that form a line or a shape.

The second canvas element may be superimposed over the first canvas element. The dimensions of the second canvas element can be adapted to dimensions of the original image. For example, the dimensions of the second canvas element may be greater than or equal to the dimensions of the original image. As such, the user may input the track over the original image to outline a portion of the original image that he or she would like to include in the result image and the input track will be recorded by the second canvas element that is laid over the first canvas element in which the original image is displayed.

The values of all the pixels of the second canvas element can be set to zero so that the second canvas element may appear transparent to the user and also not block the visibility of the original image displayed at the first canvas element. In some embodiments, the areas of the second canvas element that recorded the user input track may display pixels that are not transparent (e.g., pixels with alpha channel values greater than zero) so that the user input track drawn on the original image can be visible to the user.

For example, the browser may monitor cursor movement events and map the movement track of the cursor onto the second canvas element that is used to record the movement track of the cursor. The mapping of the input track onto the second canvas element includes pixel positions (e.g., coordinates) passed over by the cursor and corresponding pixel positions extending from these positions by a preset track threshold value (i.e., tolerance). For example, the preset track threshold associated with pixels extending from the pixel positions that the cursor passed over may be determined based on the type of drawing tool selected by the user. For example, certain drawing tools may be associated with a greater preset track threshold than others. The alpha channel values of the pixels corresponding to the track on the second canvas element may be marked as integers greater than 0 and less than or equal to 255 so as to display the input track received at the second canvas element.

Figure 5:
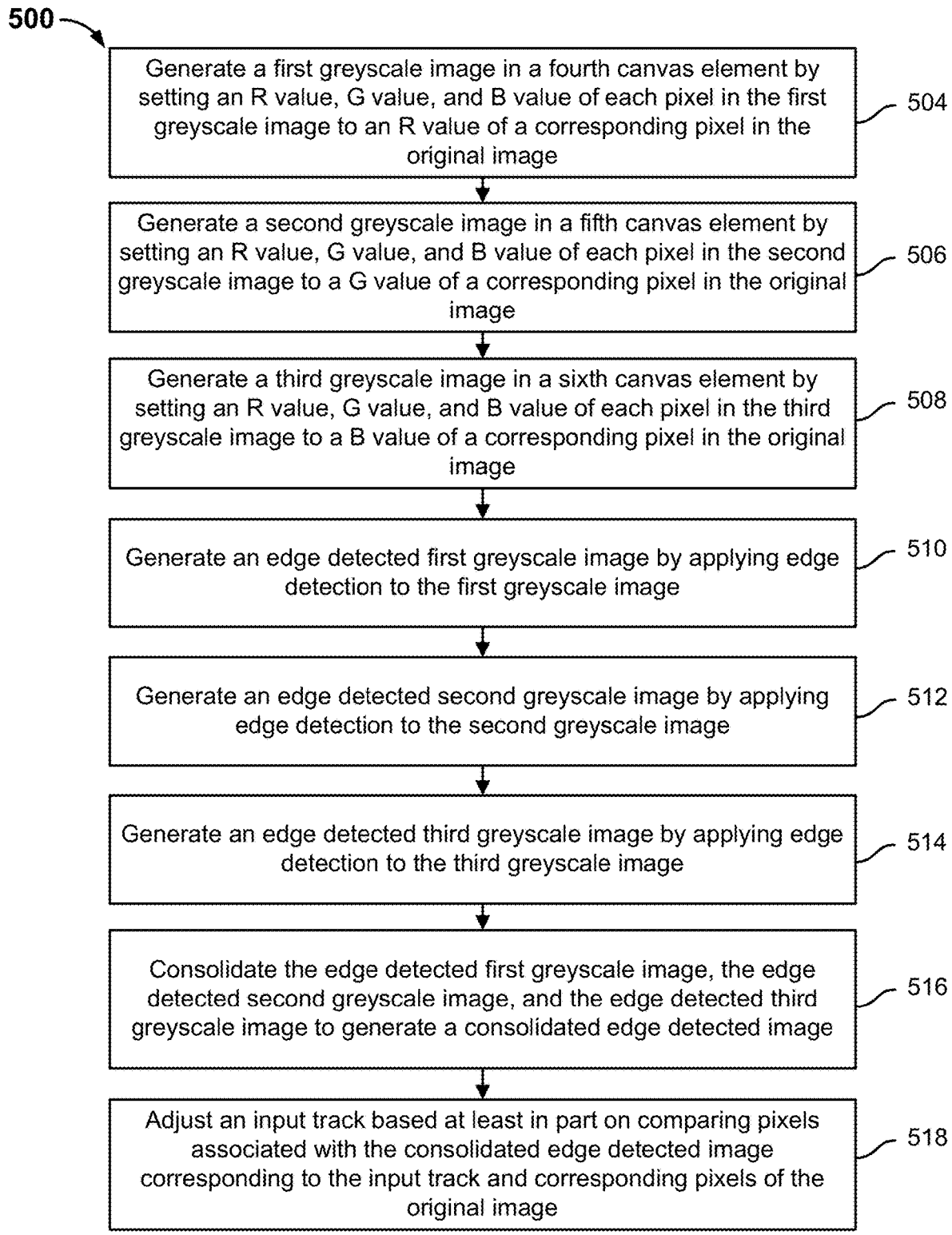
FIG. 5 is a flow diagram showing an example of a process for adjusting the input track.

At 309, optionally, the input track is adjusted. In some embodiments, due to the manual user input of the track and/or the size of the drawing tool used by the user to create the track, the pixels included in the input track may not align very well with the edges that are present in the original image. In most cases, it is assumed that the user intends to input the track to trace along edges that are present in the original image to delineate a desired portion of the original image. As such, in some embodiments, the input track can be refined to eliminate pixels of the input track that do not appear to closely match edges detected in the original image. The adjusted input track should better match edges in the original image and should be a better reference against which portion of the original image is to be selected to use as the result image. FIG. 5, below, describes an example process of adjusting the input track.

At 310, positions of the first canvas element corresponding to the input track are determined. The pixel positions included in the input track recorded by the second canvas element can be mapped onto corresponding locations/pixels/pixel coordinates of the original image in the first canvas element. As such, the pixel positions on the first canvas element that correspond to the input track are determined.

FIG. 4B shows an input track displayed over an original image. In FIG. 4B, the hot air balloon in original image A is desired to be stored as a separate, result image. As such, the user has drawn an input track around the hot air balloon, input track 402. For example, the user was able to draw input track 402 by selecting a drawing tool provided by the browser and then using the tool to trace the outline of the hot air balloon. Input track 402 may be recorded by and displayed in a second canvas element that is superimposed over the first canvas element. The pixel positions included in input track 402 are mapped to the corresponding pixel positions of the original image in the first canvas element.

Returning to FIG. 3, at 312, the positions of the first canvas element corresponding to the input track are used to select at least a portion of the original image of the first canvas element to use as a result image.

Determining the pixel positions of the first canvas element that correspond to the input track recorded in the second canvas element includes projecting the input track from the second canvas element onto the original image that was drawn in the first canvas element.

As mentioned above with step 206 of process 200 of FIG. 2, which at least portion of the original image of the first canvas element to select relative to the input track is determined based on one or more preset selection rules.

At 314, the result image is mapped from the first canvas element to a third canvas element. The third canvas element can be used to display the portion of the original image that was selected using the input track. In some embodiments, the third canvas element can be displayed at an area of the page that does not overlap with the area on the map at which the first or second canvas elements are located. In some embodiments, the dimensions of the third canvas element are adapted to those of the first canvas element. For example, the dimensions of the third canvas element may be greater than or equal to the dimensions of the first canvas element.

Prior to mapping the pixel information of the pixels of the original image selected by the input track in the first canvas element to the third canvas element, the values of all the pixels of the second canvas element can be set to zero so that the second canvas element may appear transparent to the user.

The pixel information associated with the selected portion of the original image in the first canvas object (the result image) is mapped onto the third canvas object. In some embodiments, all the pixel information from the first canvas element is mapped to the third canvas element but to ensure that only the pixels of the result image can be displayed at the third canvas element, the corresponding alpha channels of pixels included in the result image are set to values greater than 0 and less than 255 in the third canvas element but the corresponding alpha channels of pixels of the original image that are not included in the result image are set to zero. For example, the browser may use the destination-in attribute of the third canvas element to display the result image.

In this way, the browser completes the operation of mapping the portion of the original image that is selected using the input track, the result image, from the first canvas element to the third canvas element.

FIG. 4C shows a result image. Result image B of FIG. 4C is generated by mapping the portion of original image A that was enclosed by input track 402 of FIG. 4B to a third canvas element associated with FIG. 4C. Assume that in this example, the preset selection rule indicated to select the portion of the original image that was enclosed by the input track to use as the result image. As shown in FIG. 4C, only the pixels of original image A that are related to result image B are displayed at the third canvas element in FIG. 4C while the pixels of original image A that are not related to result image B are not displayed at FIG. 4C. For example, a user may store result image B of FIG. 4C to a local storage for later use. In this case, the user was able to upload an original image to a web page and cause a desired portion of the original image to be extracted as a new image, all in the browser application and without the use of any third party image processing tool. Furthermore, the result image can be displayed at the same page in real-time.

FIG. 5 is a flow diagram showing an example of a process for adjusting the input track. In some embodiments, process 500 is implemented at system 100 of FIG. 1. In some embodiments, step 309 of process 300 of FIG. 3 may be implemented at least in part using process 500.

Process 500 illustrates an example process of adjusting the input track received at a canvas element by refining the shape of the input track using edge detection on the original image. Process 500 refines the shape of the input track by eliminating pixels associated with the input track that do not match (e.g., within a threshold) a pixel of an edge detected in the original image. It is assumed that an adjusted input track whose remaining pixels match to edges detected in the original image better represent the user's intention in drawing the input track. Process 500 will refer to FIGS. 6A, through 6G, which show example images corresponding to different stages of process 500.

A first greyscale image, a second greyscale image, and a third greyscale image are generated based at least in part on an original image. The browser may draw three separate greyscale images, C1, C2, and C3, based on an original image that was uploaded. How greyscale images C1, C2, and C3 are generated are described by 504, 506, and 508, below. The alpha channel values for the three greyscale images C1, C2, and C3 may be set to zero, indicating that the greyscale images C1, C2, and C3 need not be displayed to the user, i.e., the greyscale images C1, C2, and C3 are transparent.

At 504, a first greyscale image is generated in a fourth canvas element by setting an R value, G value, and B value of each pixel in the first greyscale image to an R value of a corresponding pixel in the original image.

Figure 6A:
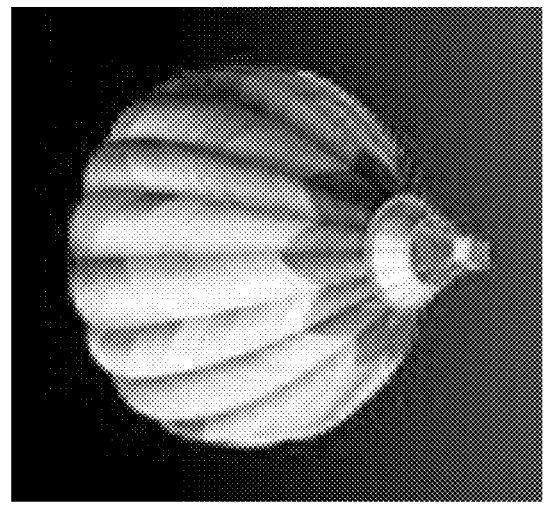
FIGS. 6A through 6G show example images corresponding to different stages of process 500.

In some embodiments, the browser creates a fourth canvas element in which the first greyscale image is drawn. The dimensions of the fourth canvas element can be adapted to the dimensions of the original image. For example, the dimensions of the fourth canvas element can be the same as the dimensions of the original image. The R value of each pixel in the original image is duplicated on the fourth canvas element as the R value of each greyscale pixel of first greyscale image C1, and the G and B values of first greyscale image C1 are set to the same numerical values as the R values. FIG. 6A shows the first greyscale image C1 after being generated by the process described in step 504 of process 500 of FIG. 5.

Returning to process 500, at 506, a second greyscale image is generated in a fifth canvas element by setting an R value, G value, and B value of each pixel in the second greyscale image to a G value of a corresponding pixel in the original image.

Figure 6B:
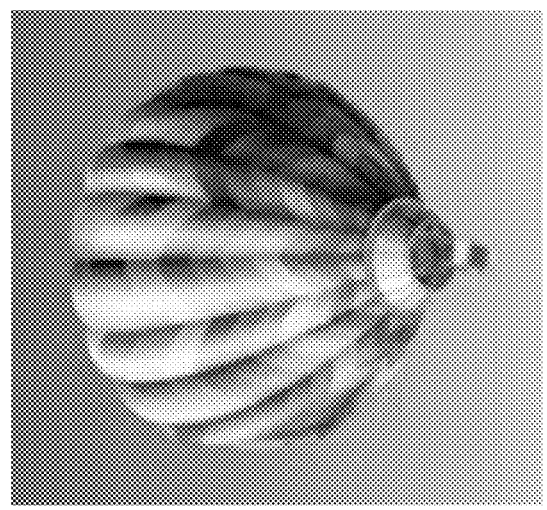

The browser can create a fifth canvas element in which the second greyscale image is drawn. The dimensions of the fifth canvas element can be adapted to the dimensions of the original image. For example, the dimensions of the fifth canvas element can be the same as the dimensions of the original image. The G value of each pixel in the original image is directly duplicated as the G value of each greyscale pixel in second greyscale image C2, and the R and B values of second greyscale image C2 are set to the same numerical values as the G values. FIG. 6B shows second greyscale image C2 after being generated by the process described in step 506 of process 500 of FIG. 5.

Returning to process 500, at 508, a third greyscale image is generated in a sixth canvas element by setting an R value, G value, and B value of each pixel in the third greyscale image to a B value of a corresponding pixel in the original image.

Figure 6C:
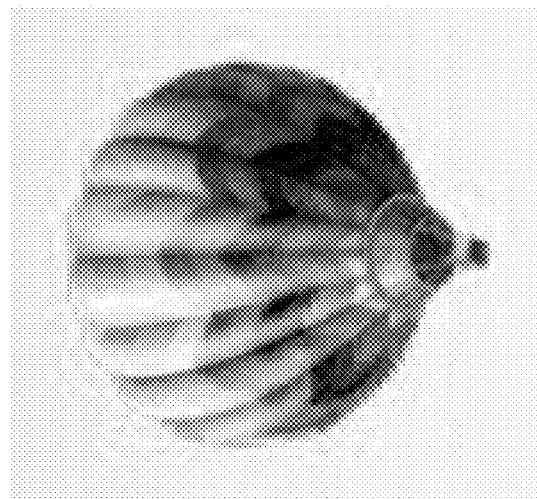
Figure 6F:
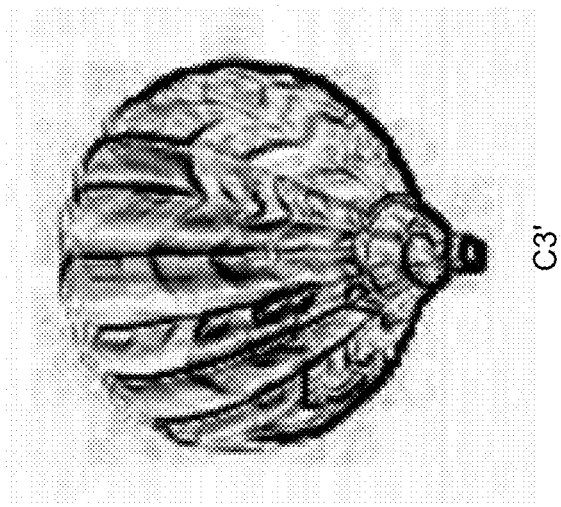

The browser can create a sixth canvas element in which the third greyscale image is drawn. The dimensions of the sixth canvas element can be adapted to the dimensions of the original image. For example, the dimensions of the sixth canvas element can be the same as the dimensions of the original image. The B value of each pixel in the original image is directly duplicated as the B value of each greyscale pixel in third greyscale image C3, and the R and G values of third greyscale image C3 are set to the same numerical values as the B values. FIG. 6C shows third greyscale image C3 after being modified by the process described in step 508 of process 500 of FIG. 5.

Figure 6E:
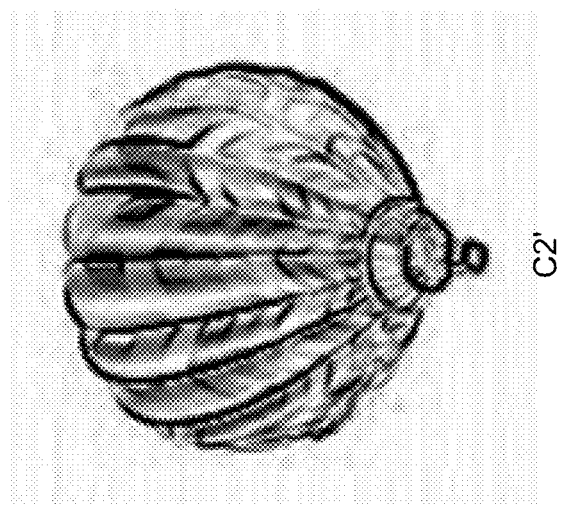
Figure 6D:
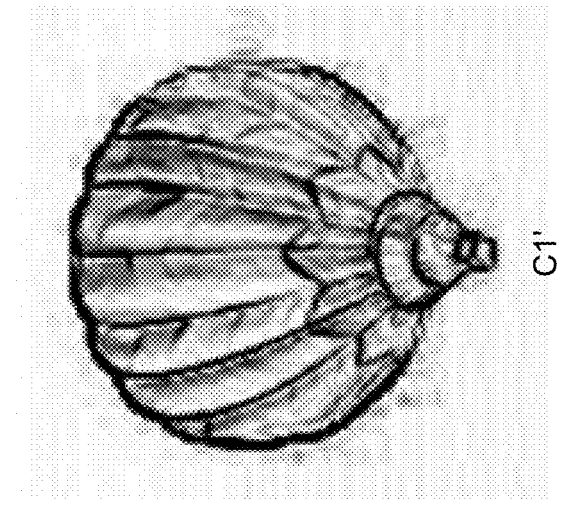

Returning to process 500, at 510, an edge detected first greyscale image is generated by applying edge detection to the first greyscale image. Processing is applied to first greyscale image C1 to emphasize the edges that are present in that greyscale image. The following is an example technique by which to detect edges in first greyscale image C1: assume that the R value of a current pixel is r. Read the R values of the pixels for the adjacent positions surrounding the current pixel (e.g., the eight adjacent pixels surrounding the current pixel). Add them together to obtain the value s. Then, re-calculate the R value of the current pixel as $(8*r-s)/8$. Repeatedly perform pixel R-value calculations at pixel positions corresponding to the input track in first greyscale image C1 or at all pixel positions in first greyscale image C1 to obtain edge detected first greyscale image C1'. FIG. 6D shows an edge detected first greyscale image C1'.

Returning to process 500, at 512, an edge detected second greyscale image is generated by applying edge detection to the second greyscale image. Processing is applied to second greyscale image C2 to emphasize the edges that are present in that greyscale image. The following is an example technique by which to detect edges in second greyscale image C2: assume that the G value of a current pixel is g. Read the G values of the pixels for the adjacent positions surrounding the current pixel (e.g., the eight adjacent pixels surrounding the current pixel). Add them together to obtain the value s. Then, re-calculate the G value of the current pixel as $(8*g-s)/8$. Repeatedly perform pixel G-value calculations at pixel positions corresponding to the input track in second greyscale image C2 or at all pixel positions in second greyscale image C2 to obtain edge detected second greyscale image C2'. FIG. 6E shows an edge detected second greyscale image C2'.

Returning to process 500, at 514, an edge detected third greyscale image is generated by applying edge detection to the third greyscale image. Processing is applied to third greyscale image C3 to emphasize the edges that are present in that greyscale image. The following is an example technique by which to detect edges in third greyscale image C3: assume that the B value of a current pixel is b. Read the B values of the pixels for the adjacent positions surrounding the current pixel (e.g., the eight adjacent pixels surrounding the current pixel). Add them together to obtain the value s. Then, re-calculate the B value of the current pixel as $(8*b-s)/8$. Repeatedly perform pixel B-value calculations at pixel positions corresponding to the input track in third greyscale image C3 or at all pixel positions in third greyscale image C3 to obtain edge detected third greyscale image C3'. FIG. 6E shows an edge detected third greyscale image C3'.

Figure 6G:
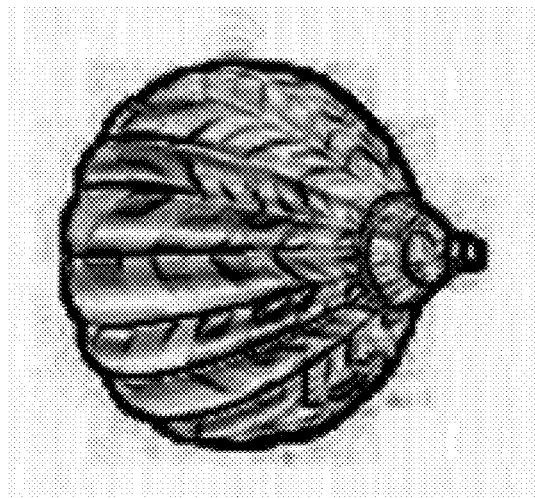

Returning to process 500, at 516, the edge detected first greyscale image, the edge detected second greyscale image, and the edge detected third greyscale image are consolidated to generate a consolidated edge detected image. The browser consolidates the three edge detected images C1', C2', and C3' to obtain a consolidated edge detected image with sharper edges (as shown in FIG. 6G). For example, R, G and B values of each pixel in the consolidated edge detected image are the minimum values of each corresponding pixel in the edge detected images C1', C2', and C3'. That is, the R value of each pixel in the consolidated edge detected image is the smallest of the R values of the corresponding pixel among the edge detected images C1', C2', and C3'. The G value of each pixel in the consolidated edge detected image is the smallest of the G values of the corresponding pixel among the edge detected images C1', C2', and C3'. The B value of each pixel in the consolidated edge detected image is the smallest of the B values of the corresponding pixel among the edge detected images C1', C2', and C3'. FIG. 6G shows a consolidated edge detected image that was determined by consolidating C1', C2', and C3'.

Returning to process 500, at 518, an input track is adjusted based at least in part on comparing pixels associated with the consolidated edge detected image corresponding to the input track and corresponding pixels of the original image. The pixels of the input track may be eliminated based on comparing with the pixel values of the original image that correspond to the input track to the pixel values of the corresponding pixels in the consolidated edge detected image. For example, the difference between the pixel value of each pixel in the consolidated image corresponding to the input track and the RGB value of the corresponding pixel in the original image is determined. When the magnitude of the difference is greater than a preset adjustment threshold value, the pixel/pixel position is eliminated from the set of pixels that is associated with the input track. By comparing a pixel value of the pixel corresponding to the input track in both the consolidated edge detected image and the original image, it is checked whether an edge is associated with that pixel in the original image. If an edge is not associated with that pixel in the original image and thus a magnitude of the difference is greater than the preset adjustment threshold value, then the pixel is removed from the set of pixels associated with the input track. By performing such comparisons and deletions of pixels/pixel positions that belong to the set of pixels associated with the input track, the shape of the input track may be adjusted to better match the actual edges detected in the original image.

Figure 7:
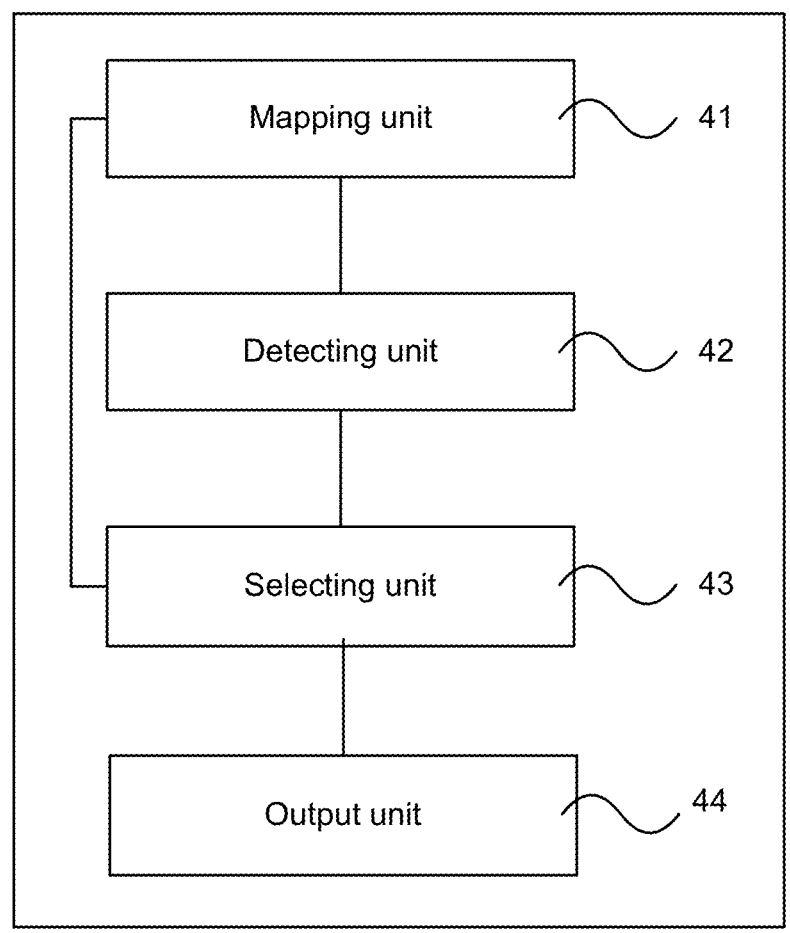
FIG. 7 is a diagram of an embodiment of a system of performing image processing.

FIG. 7 is a diagram of an embodiment of a system of performing image processing. In the example, system 700 includes mapping unit 41, detecting unit 42, and selecting unit 43.

The units can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices.

Mapping unit 41 is configured to generate an editable object to be displayed on a page and map the pixel information of an original image onto that editable object. In some embodiments, an editable object may include but is not limited to an HTML5 canvas element, an object element, or an embedded element. In some embodiments, mapping unit 41 is configured to determine whether the dimensions of the original image fall within a designated dimension range. If not, then mapping unit 41 is configured to adjust the dimensions of the original image to conform to the designated dimension range and further processing proceeds on the adjusted original image. Detecting unit 42 is configured to detect the track input at the page via input equipment. Selecting unit 43 is configured to use the input track to select at least a portion of the original image to serve as a result image. In some embodiments, selecting unit 43 is configured to select at least a portion of the original image relative to an input track to use a result image based at least in part on preset selection rules, such as those discussed above. In some embodiments, selecting unit 43 may also give further consideration to a portion of the original image that is covered by the input track. The portion of the original image that is covered by the input track may also be selected to be included in the result image, depending on a preset selection rule, for example. Therefore, the result image may include a portion of the original image that is covered by the track.

Mapping unit 41 is further configured to generate another editable object, map the pixel information of a selected portion of the original image (the result image) onto that editable object, and cause the result image to be displayed at the page. For example, the result image can be stored and used for later processing.

In some embodiments, mapping unit 41 is configured to obtain the pixel information of the original image and to draw the pixel information onto an editable object. The dimensions of the editable object in which the original image is drawn may be adapted to the dimensions of the original image. For example, the dimensions of the editable object may be greater than or equal to the dimensions of the original image.

In some embodiments, detecting unit 42 is further configured to generate an editable object on the page to use to detect a track input by a user using an input equipment/interface. The editable object is used to detect the track. The dimensions of the editable object that is used to detect the input track may be adapted to the dimensions of the original image. For example, the dimensions of the editable object may be greater than or equal to the dimensions of the original image. In some embodiments, the editable object that is used to detect the input track is superimposed over the editable object in which the original image is drawn at the page. To avoid blocking the display of the original image on the page, all pixel information values of all pixels on the editable object that is used to detect the input track are set to zero. When the user draws over the original image, the input track can be detected on the superimposed editable object.

In various embodiments, positions of the input track are mapped onto corresponding positions of the editable object in which the original image is displayed. Selecting unit 43 may use the track mapped onto the editable object in which the original image was drawn to select at least a portion of the original image to use as a result image. The selected at least portion of the original image is then mapped onto another editable object to be used to display the result image. For example, all values of all pixels on the editable object to be used to display the result image are initially zero. After the result image is mapped onto the editable object to be used to display the result image, the pixel information of the result image is displayed in that editable object. The pixel information of the editable object in which the result image is mapped comprises pixel alpha values. When the pixel information of the editable object is mapped onto that editable object, the alpha values of the result image pixels are set to numerical values greater than 0 and less than 255, and the alpha values of non-result image pixels are set to zero.

In some embodiments, selecting unit 43 is further configured to adjust the input track so as to refine the shape of the input track as appropriate. This can help the user improve result image selection accuracy. For example, selecting unit 43 may use edge detection technology to adjust the input track and to use the adjusted input track to select at least part of a portion of the original image as the result image.

In some embodiments, output unit 44 is configured to send web page data (e.g., to a client device). In various embodiments, the web page data can be executed at the client device and enable the client device to perform at least some of the functions that mapping unit 41, detecting unit 42, and selecting unit 43 are configured to perform.

Figure 8:
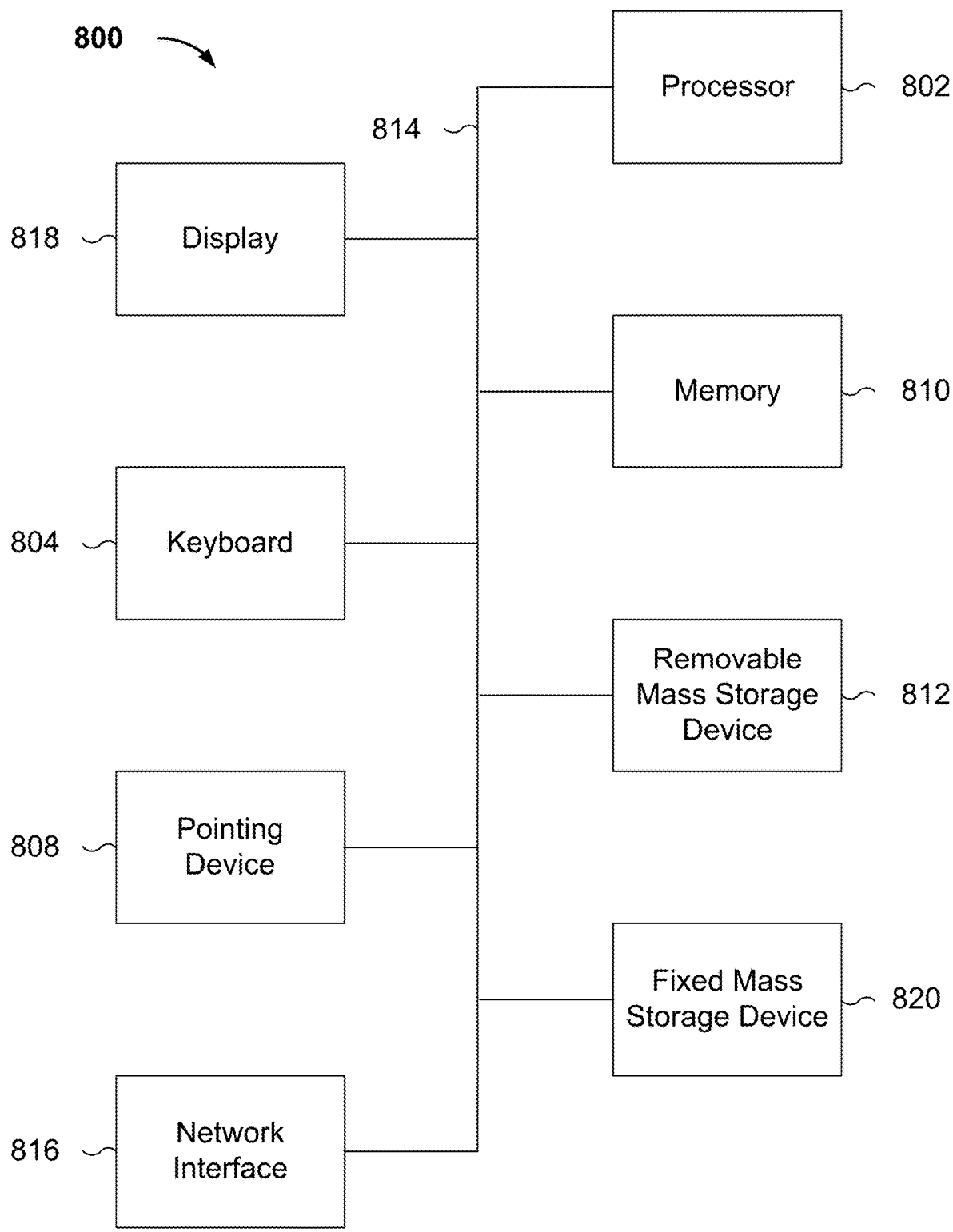
FIG. 8 is a functional diagram illustrating an embodiment of a programmed computer system for implementing the performance of image processing.

FIG. 8 is a functional diagram illustrating an embodiment of a programmed computer system for implementing the performance of image processing. As will be apparent, other computer system architectures and configurations can be used to determine the performance of image processing. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818). In some embodiments, processor 802 includes and/or is used to provide the performance of image processing.

Processor 802 is coupled bi-directionally with memory 810, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800 and is coupled either bi-directionally (read/write) or uni-directionally (read only) to processor 802. For example, storage 812 can also include computer readable media such as magnetic tape, flash memory, PC-CARDS, portable mass storage devices, holographic storage devices, and other storage devices. A fixed mass storage 820 can also, for example, provide additional data storage capacity. The most common example of fixed mass storage 820 is a hard disk drive. Mass storage 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display 818, a network interface 816, a keyboard 804, and a pointing device 808, as well as an auxiliary input/output device interface, a sound card, speakers, and other subsystems as needed. For example, the pointing device 808 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

In some embodiments, computing equipment comprises one or more processors (CPUs), input/output interfaces, network interfaces, and memory. Memory may include such forms as volatile storage devices in computer-readable media, random access memory (RAM) and/or non-volatile memory, such as read-only memory (ROM) or flash memory (flash RAM). Memory is an example of a computer-readable medium.

Computer-readable media, including permanent and non-permanent media and removable and non-removable media, may achieve information storage by any technique or technology. Information can be computer-readable commands, data structures, program modules, or other data. Examples of computer storage media include but are not limited to phase-change memory (PRAM), static random access memory (SRAM), dynamic random access memory (DRAM), other types of random access memory, read-only memory (ROM), electrically erasable programmable read-only memory (EEPROM), flash memory, or other memory technology, CD-ROM, digital multifunction disc (DVD) or other optical storage, magnetic cassettes, magnetic tape or magnetic disc memory, or other magnetic storage equipment or any other non-transmission media that can be used to store information that is accessible to computers. As defined in this document, computer-readable media does not include transitory computer-readable media, such as modulated data signals and carrier waves.

The disclosed systems and methods may be realized in other ways in several embodiments provided by the present application. For example, the system embodiments described above are merely illustrative. For example, the division into the units is merely a division by logical function. When actually implemented, there may be other forms of division. For example, multiple units or components may be combined or integrated into another system, or some features might be omitted or not executed. In addition, mutual couplings or direct couplings or communication connections that are displayed or discussed may be indirect couplings or communication connections through some interfaces, devices, or units. They may be electrical or mechanical or take another form.

The units described as separate components may or may not be physically separate, and components displayed as units may or may not be physical units. They may be located in one place, or they may be distributed across multiple network units. The embodiment schemes of the present application can be realized by selecting part or all of the units in accordance with actual need.

In addition, each functional unit in each of the embodiments of the present application may be integrated into a processing unit, or each unit may have an independent physical existence. Or two or more units may be integrated into one unit. The integrated units may take the form of hardware, or they may take the form of hardware combined with software function units.

The integrated units that take the form of software function units may be stored in computer-readable storage media. The software function units are stored in a storage medium. This includes some commands for causing a computer device (which could be a personal computer, a server, or a network device) or a processor to execute some of the steps in the methods described by the various embodiments of the present application. The above-described storage media includes: flash drives, portable hard drives, read-only memory (ROM), random access memory (RAM), magnetic disks, or optical disks, and any other media that can store program codes.

The above embodiments only serve to explain the technical solutions of the present application and not to limit it. Although the present application was explained in detail with reference to the above-described embodiments, persons skilled in the art should understand that they may modify the technical solutions recorded in the various embodiments described above or provide equivalent substitutions for some of their technical features. Yet these modifications or substitutions do not cause the corresponding technical solutions to substantively depart from the spirit and scope of the technical solutions of the various embodiments of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  one or more processors configured to:
    cause an original image to be displayed in a first editable object of a web page in a web browser, wherein the first editable object is generated based at least in part on web page data from a server;
    receive an input track corresponding to the original image of the first editable object of the web page, wherein the input track comprises a set of pixels that form a line or shape over the original image; and
    select at least a portion of the original image relative to the input track to use as a result image, wherein:
      to select the at least the portion of the original image comprises: in response to a determination that the input track does not form a closed track, to use computer code included in the web page data to modify the input track based at least in part on extrapolating data associated with the input track to form an enclosed track;
      the at least the portion of the original image is selected:
        relative to the enclosed track;
        based at least in part on a comparison of at least a part of the input track to a detected edge of the original image; and
        based at least in part on one or more image selection rules associated with comparing a first part of the input track to a second part of the input track;
    cause the result image to be displayed in a second editable object, wherein the second editable object is generated based at least in part on the web page data, the input track, one or more input track characteristics associated with an input tool used in connection with an input of the input track, and the at least the portion of the original image that is selected; and
  a memory coupled to the one or more processors and configured to provide the one or more processors with instructions.

2. The system of claim 1, wherein the one or more processors are further configured to:
  determine that a dimension associated with the original image is out of a designated dimension range; and
  in response to the determination, adjust the dimension associated with the original image to conform to the designated dimension range.

3. The system of claim 1, wherein a dimension of the first editable object is determined based at least in part on a dimension of the original image.

4. The system of claim 1, wherein the one or more processors are further configured to generate a third editable object to receive the input track, wherein the third editable object is superimposed over the first editable object at the web page.

5. The system of claim 4, wherein a dimension of the third editable object is determined based at least in part on a dimension of the original image.

6. The system of claim 1, wherein the one or more processors are further configured to receive the original image.

7. The system of claim 1, wherein the one or more processors are further configured to determine positions of the first editable object corresponding to the input track.

8. The system of claim 7, wherein the one or more processors are further configured to use the positions of the first editable object corresponding to the input track to select the at least portion of the original image of the first editable object to use as the result image.

9. The system of claim 1, wherein the one or more processors are further configured to:
  generate a greyscale image in a fourth editable object by setting one of an R value, a G value, and a B value of each pixel in the greyscale image to a corresponding one of an R value, a G value, and a B value of a corresponding pixel in the original image;
  generate an edge detected greyscale image by applying edge detection to the greyscale image; and
  adjust the input track based at least in part on comparing pixels associated with at least the edge detected greyscale image and corresponding pixels of the original image.

10. The system of claim 1, wherein the at least portion of the original image selected relative to the input track to use as the result image is based at least in part on a preset selection rule.

11. A method, comprising:
  causing an original image to be displayed in a first editable object of web page in a web browser, wherein the first editable object is generated based at least in part on web page data from a server;
  receiving, by an input interface, an input track corresponding to the original image of the first editable object of the page, wherein the input track comprises a set of pixels that form a line or shape over the original image;
selecting at least a portion of the original image relative to the input track to use as a result image wherein:
selecting the at least the portion of the original image comprises in response to a determination that the input track does not form a closed track, using computer code included in the web page data to modify the input track based at least in part on extrapolating data associated with the input track to form an enclosed track;
the at least the portion of the original image is selected:
relative to the enclosed track;
based at least in part on a comparison of at least a part of the input track to a detected edge of the original image; and
based at least in part on one or more image selection rules associated with comparing a first part of the input track to a second part of the input track; and
causing the result image to be displayed in a second editable object, wherein the second editable object is generated based at least in part on the web page data, the input track, one or more input track characteristics associated with an input tool used in connection with an input of the input track, and the at least the portion of the original image that is selected.

12. The method of claim 11, further comprising:
determining that a dimension associated with the original image is out of a designated dimension range; and
in response to the determination, adjusting the dimension associated with the original image to conform to the designated dimension range.

13. The method of claim 11, wherein a dimension of the first editable object is determined based at least in part on a dimension of the original image.

14. The method of claim 11, further comprising generating a third editable object to receive the input track, wherein the third editable object is superimposed over the first editable object at the web page.

15. The method of claim 14, wherein a dimension of the third editable object is determined based at least in part on a dimension of the original image.

16. The method of claim 11, further comprising receiving the original image.

17. The method of claim 11, further comprising determining positions of the first editable object corresponding to the input track.

18. The method of claim 17, further comprising using the positions of the first editable object corresponding to the input track to select the at least portion of the original image of the first editable object to use as the result image.

19. The method of claim 11, further comprising adjusting the input track based at least in part on performing edge detection on the original image.

20. A computer program product, the computer program product being embodied in a non-transitory computer readable storage medium and comprising computer instructions for:
causing an original image to be displayed in a first editable object of web page in a web browser, wherein the first editable object is generated based at least in part on web page data from a server;
receiving an input track corresponding to the original image of the first editable object of the page, wherein the input track comprises a set of pixels that form a line or shape over the original image;
selecting at least a portion of the original image relative to the input track to use as a result image wherein:
selecting the at least the portion of the original image comprises in response to a determination that the input track does not form a closed track, using computer code included in the web page data to modify the input track based at least in part on extrapolating data associated with the input track to form an enclosed track;
the at least the portion of the original image is selected:
relative to the enclosed track;
based at least in part on a comparison of at least a part of the input track to a detected edge of the original image; and
based at least in part on one or more image selection rules associated with comparing a first part of the input track to a second part of the input track; and
causing the result image to be displayed in a second editable object, wherein the second editable object is generated based at least in part on the web page data, the input track, one or more input track characteristics associated with an input tool used in connection with an input of the input track, and the at least the portion of the original image that is selected.

21. The system of claim 1, wherein the one or more processors are further configured to:
receive an upload request from a user; and
upload the original image to the web page, wherein the original image is locally stored at a client device associated with the user.

22. The system of claim 1, wherein the one or more processors are further configured to:
select the result image based at least in part on determining whether a starting point of the input track and an ending point of the input track are within a preset threshold distance.

23. The system of claim 1, wherein the one or more image selection rules are included in the web page data.

24. The system of claim 1, wherein the input tool has an associated width of input, and a width of the input track is based at least in part on the input tool used.

25. The system of claim 1, wherein the one or more processors are further configured to display the result image, including displaying the at least the portion of the original image that is selected relative to the input track and displaying a remaining portion as transparent or hidden.

26. The system of claim 1, wherein the one or more processors are further configured to adjust the input track to modify one or more pixels on the input track that are a distance from a corresponding point on the input track that exceeds a preset distance threshold.

27. The system of claim 1, wherein the one or more processors are further configured to modify the input track based at least on a result of an edge detection of the original image.

28. The system of claim 1, wherein to cause the original image to be displayed in a first editable object of the page includes presenting the original image in a first canvas element, and the input track is input to a second canvas element.

29. The system of claim 28, wherein the second canvas element is presented to be overlaid with the first canvas element, and pixels of the second canvas element are set to be transparent before the input track is input to the second canvas element.

30. The system of claim 28, wherein the result image is determined based at least in part on information relating to a first set of pixels of the first canvas element and a second set of pixels of the second canvas element.

31. The system of claim 1, wherein the second editable object is included in the web page displayed in the web browser.

32. The system of claim 1, wherein the at least the portion of the original image of the first editable object that is selected is mapped to the second editable object, the first editable object being mapped to the second editable object based at least in part on code or language included in the web page data.

33. The system of claim 1, wherein one or more processors are further configured to determine the input tool used in connection with the input of the input track, the input tool being selected from among a plurality of input tools, wherein each of the plurality of input tools have corresponding input track characteristics.

* * * * *